(12) United States Patent
Hasegawa et al.

(10) Patent No.: US 6,484,075 B2
(45) Date of Patent: Nov. 19, 2002

(54) IDLE CONTROL DEVICE FOR FUEL CELL VEHICLE

(75) Inventors: Yusuke Hasegawa, Wako (JP); Satoshi Aoyagi, Wako (JP); Hibiki Saeki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/875,122

(22) Filed: Jun. 7, 2001

(65) Prior Publication Data

US 2001/0053950 A1 Dec. 20, 2001

(30) Foreign Application Priority Data

Jun. 12, 2000 (JP) ........................................ 2000-176032

(51) Int. Cl.[7] ............................ H01M 8/04; B60L 11/18
(52) U.S. Cl. ........................... 701/22; 180/65.1; 180/293
(58) Field of Search .............................. 701/22; 180/6.5, 180/220, 53.4, 65.1, 65.2, 65.3, 60, 293

(56) References Cited

U.S. PATENT DOCUMENTS

| | | | | |
|---|---|---|---|---|
| 5,629,102 A | * | 5/1997 | Werth | 429/17 |
| 5,643,352 A | * | 7/1997 | Werth | 429/12 |
| 5,820,172 A | * | 10/1998 | Brigham et al. | 180/65.4 |
| 6,116,363 A | * | 9/2000 | Frank | 180/65.2 |
| 6,230,496 B1 | * | 5/2001 | Hofmann et al. | 180/65.2 |
| 6,307,277 B1 | * | 10/2001 | Tamai et al. | 180/65.2 |
| 6,333,620 B1 | * | 12/2001 | Schmitz et al. | 320/132 |

* cited by examiner

Primary Examiner—Tan Nguyen
(74) Attorney, Agent, or Firm—Arent Fox Kintner Plotkin & Kahn, PLLC

(57) ABSTRACT

In order to improve the fuel consumption efficiency of the fuel cell vehicles, a control flow is provided, in which, first, it is determined whether the vehicle speed VST is lower than a predetermined speed ISTP (step S01), whether a motor output PMCMD including the driving motor and the motor for driving the air compressor is less than a predetermined motor output ISTPPM (step S04), whether the brake is in the ON state (step S05), and whether the terminal voltage Vst of the power storage unit is higher than predetermined values VISTPH and VISTPL (step S06). When all of the determinations are "YES", a permission flag for executing the idle stop F_ISTP is set to "1", and if any of them is "NO", the permission flag F_ISTP is set to "0".

7 Claims, 6 Drawing Sheets

IDLE CONTROL DEVICE FOR FUEL CELL VEHICLE

BACKGROUND OF THE INVENTION

1. Field of the Invention

The present invention relates to an idle control device for fuel cell vehicles, and in particular, relates to a control device and a control method for controlling the idle stop of fuel cell vehicles, in which a hybrid type power source device provided with a power storage unit assists the power supply of the fuel cell to the load.

2. Description of the Related Art

As disclosed in Japanese Unexamined Patent Application, First Publication No. Hei 8-214453, a conventional-type fuel cell vehicles are known, in which a solid polymer membrane-type fuel cell is installed and this type of fuel cell vehicles is provided with a hybrid-type power source which comprises a power storing device such as a battery or a capacitor in addition to the fuel cell in order to improve an output response of the fuel cell caused by the supply of hydrogen as the fuel or supply of air as an oxidizing agent.

In the above-described conventionally known fuel cell vehicles, as shown in the power generation efficiency shown in FIG. 6, the power consumption of the auxiliary devices for driving the fuel cell, such as the air compressor, is relatively low when the fuel cell generates intermediate or higher outputs, and in such intermediate or high output regions of the fuel cell, the fuel consumption rate for a unit amount of power generation increases in proportion to the output of the fuel cell.

In contrast, in the low output region of the fuel cell, the power consumption rate of the auxiliary devices becomes relatively high, and the power generation efficiency of the fuel cell decreases. Therefore, at the time of idle driving such that the power consumption for driving the vehicle is zero, if the power is supplied from the fuel cell, a problem arises in that the fuel consumption efficiency of the vehicle is deteriorated.

SUMMARY OF THE INVENTION

The present invention is made in order to solve the above-described problems, and the present invention provides an idle control apparatus for a fuel cell vehicle, which is provided with a hybrid-type power source device, and which is capable of improving the fuel efficiency.

A first aspect of the present invention provides an idle control device for a fuel cell vehicle, comprising a power storage unit (for example, the power storage unit 12 described later in the present embodiment) for supplying electric power to a driving motor (for example, a driving motor 13 described later in the present embodiment) of the fuel cell vehicle and/or auxiliary devices of the fuel cell vehicle for assisting the output of the fuel cell, and for storing energy generated by the fuel cell (for example, a fuel cell 11 described later in the present embodiment) and regenerative energy to be obtained by a regenerative operation of the driving motor; and a fuel cell driving device (for example, an air compressor 15 described later in the present embodiment) for supplying reaction gases (for example, hydrogen gas and air described later in the present embodiment) for power generating and a fuel cell drive control device (for example, ECU 18 described later in the present embodiment) for controlling operation of the fuel cell driving device; wherein the fuel cell driving device stops the power generation of said fuel cell by stopping supply of said reaction gases when the fuel cell vehicle is in a predetermined idling state.

According to the idle control device for the fuel cell vehicle of the present invention, in response to driving conditions, the power generation of the fuel cell is stopped by stopping the fuel cell driving auxiliary devices such as an air compressor, so that it is possible to improve the fuel consumption efficiency of the present fuel cell vehicle.

In the above idle control device for a fuel cell vehicle comprising a rotational rate detecting device (for example, a magnetic pole position-angular velocity detector 35 described later in the present embodiment) for detecting a rotational rate of the driving motor, a brake operation state detecting device (for example, a brake operation state detecting device BR described later in the present embodiment) for detecting the operational state of a brake of the fuel cell vehicle, a state of charge detecting device (for example, a terminal voltage VSt of the power storage unit described later in the present embodiment) for detecting a state of charge of said power storage unit, and a load detecting device (for example, a control portion 23 of PDU 14 and the air compressor 15 described later in the present embodiment) for detecting an electric load of the fuel cell vehicle, the power generation of the fuel cell vehicle is stopped by stopping supply of said reaction gases, when said rotational rate detecting device, said brake operation state detecting device, said state of charge detecting device, and said load detecting device detect that the fuel cell vehicle is in the idling state which is capable of stopping the power generation of the fuel cell by stopping supply of the reaction gases.

The above idle control device for the fuel cell vehicle with the above constitution makes it possible not only to improve the fuel consumption efficiency, but also to restart the fuel cell by driving the fuel cell drive auxiliary devices such as the air compressor.

In the above idle control device for a fuel cell vehicle, when the rotational rate is zero or is lower than a predetermined rotational rate, the brake is in the ON state, the state of charge is less than a predetermined state of charge, and the electric load is less than a predetermined load, it is determined that the vehicle is in the idling state capable of stopping the power generation of the fuel cell and the power generation of the fuel cell is stopped by stopping supply of the reaction gases by the fuel cell driving device.

According to the above idle control device for the fuel cell vehicle, in determining to execute the idle stop, it is determined whether the state of charge of the power storage unit is higher than a predetermined value, so that it is possible to ensure the electric power for restarting the fuel cell and the fuel cell can be restarted smoothly.

In the above idle control device for a fuel cell vehicle, when the fuel cell driving device is stopping, the fuel cell drive control device actuates the fuel cell driving device when the state of charge of the power storage unit is reduced below a predetermined state of charge.

According to the above constitution of the idle control device, when the fuel cell is restarted while the fuel cell is stopping, electric power is first supplied from the power storage unit to the fuel cell drive auxiliary device such as the air compressor, and power generation by the fuel cell is restarted so that the power supply from the power storage unit is reduced. Thus, charging and discharging of the power storage unit is repeated depending on the driving conditions of the fuel cell vehicle, and when the fuel cell vehicle stops, the power storage unit is charged by the regenerative operation and the terminal voltage increases.

Note that when a capacitor is used as the power storage unit, the terminal voltages of the capacitor are set in place of the state of charge of the capacitor such that the power generation of the fuel cell is stopped when the terminal voltage exceeds a predetermined upper limit (for example, around 360V), and the power generation of the fuel cell is restarted when the terminal voltage of the fuel cell is reduced below the lower limit (for example, around 300V).

When a battery is used as the power storage unit, the state of charge of the battery is set such that the fuel cell is stopped when the state of charge of the battery exceeds a predetermined upper limit of 81% and the fuel cell is restarted when the state of charge of the battery is reduced below a predetermined lower limit of 56%.

Thereby, even when the fuel cell is stopping, it is possible to restart the fuel cell drive auxiliary device such as the air compressor, and the fuel consumption efficiency can be improved.

In the above idle control device for the fuel cell vehicle, the predetermined state of charge is set to a value capable of driving the fuel cell driving device and the driving motor for a predetermined time.

According to the above idle control device for a fuel cell vehicle, the predetermined state of charge for stopping the power generation of the fuel cell is set to a value of a state of charge which is capable of supplying power to the fuel cell drive auxiliary device such as the air compressor for a predetermined time, for example, an hour. Accordingly, even while the fuel cell is stopping, the driving motor and the air compressor can be restarted smoothly.

DETAILED DESCRIPTION OF THE INVENTION

Figure 1:
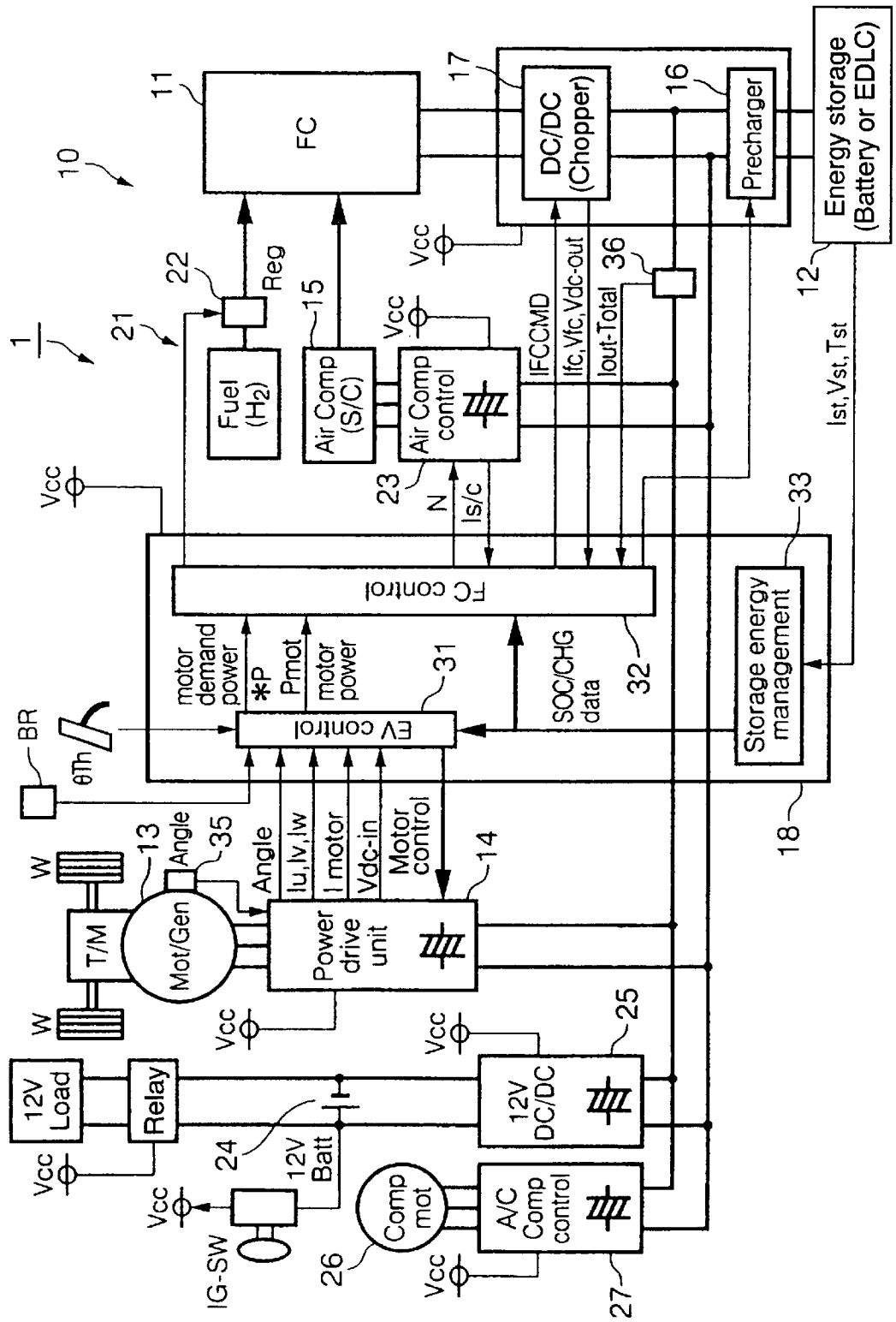
FIG. 1 is a diagram showing the structure of the fuel cell vehicle provided with an idle control device according to one embodiment of the present invention.

Hereinafter, an idle control device for a fuel cell vehicle according to one embodiment of the present invention is described with reference to the attached drawings. FIG. 1 is a diagram showing the structure of the fuel cell vehicle 1 provided with an idle control device 10 according to one embodiment of the present invention.

The fuel cell vehicle 1 according to the present invention is provided with a hybrid-type power source comprised of, for example, the fuel cell 11 and a power storage unit 12. A driving force of the driving motor 13, to which the electric power is supplied from the hybrid-type power source, is transmitted to driving wheels W through a transmission T/M which comprises either one of an automatic transmission or a manual transmission. When a driving power is transmitted from the driving wheels to the driving motor 13 at the time of deceleration of the fuel cell vehicle 1, the driving motor performs a function as a generator for generating a regenerative braking force; thereby the kinetic energy of the vehicle body is recovered as the electric energy.

The idle control device 19 of the fuel cell vehicle according to the present invention comprises, for example, a fuel cell 11, a power storage unit 12, a driving motor 13, a PDU (Power Drive Unit) 14, an air compressor 15 as a auxiliary device for driving fuel cell, a primary precharge portion 16, a secondary precharge portion 17, and an ECU (Electronic Control Unit) 18.

The driving motor 13 is constituted by a permanent magnet-type three-phase AC synchronous motor using the permanent magnet as the magnetic field.

The PDU14, which comprises a PWM inverter constituted by switching elements such as, for example, IGBTs and the like, converts a dielectric current output from the fuel cell 11 or the power storage device 12 to the three-phase AC current electric power based on a torque order output from the ECU 18 for supplying to the driving motor 13.

The fuel cell 11 is constituted by a stack of cells, which is composed of a plurality of cells, each of which is formed by inserting a solid polymer electrolyte membrane between an anode and a cathode, and the fuel cell is provided with a hydrogen electrode, to which hydrogen is supplied as a fuel gas, and an air electrode, to which air containing oxygen as an oxidizing agent, is supplied. Hydrogen ions generated by a catalytic reaction at the anode are transferred to the cathode passing through the solid polymer electrolyte membrane, and electric power is generated at the cathode by the electrochemical reaction of the hydrogen ions with the oxygen.

A fuel supply portion 21 which is connected to the fuel electrode side of the fuel cell 11 comprises a pressure control portion 22 for supplying hydrogen by a control signal output from the ECU 19 or by a pressure corresponding to an air pressure supplied by the compressor 15 as a signal pressure.

The compressor 15 connected to the air electrode of the fuel cell 11 supplies air not only to the air electrode of the fuel cell 11, but also as a signal pressure to the pressure control portion 15. Thus, a rotational rate command value N for a motor to drive the compressor 15 is input from the ECU 18 to the control portion 23 of the air compressor 15.

The power storage unit 12 may be constituted by a capacitor such as an electric double layer capacitor or an electrolytic capacitor. The electric double layer capacitor is preferably used as a power storage unit. When an electric double layer capacitor is used, the state of charge of said power storage unit is determined by the charging voltage of the electric double layer capacitor. The fuel cell 11 and the power storage unit 12 are connected in parallel to the driving motor 13, which is an electric load on these power sources.

The primary charge portion 16 is connected to the output side of the power storage unit 12, and a secondary precharge portion 17 is connected to the output side of the fuel cell 11.

The primary charge portion 16 comprises a high voltage switch and a current controller (not illustrated). When a current supplied to the electric load such as the driving motor 13 becomes large, the primary charge portion 16 makes the current flow through a resistor by opening the high voltage switch and also by closing the current controller, which comprises a resistor having a predetermined resistance.

The secondary precharge portion 17, which is comprised of a current limiter constituted by, for example, a DC-DC chopper and the like, control the output current Ifc from the fuel cell 11 based on a current command value IFCCMD, that is, based on a generation command to the fuel cell 11.

In addition, the control portion 23 of the air compressor 15 and the PDU 14 are connected in parallel with the fuel cell 11 through the secondary precharge portion 17.

Furthermore, an auxiliary 12 V battery used for driving various control devices and the auxiliary devices of the fuel cell vehicle 1 comprises a DC-DC converter 25, and the DC-DC converter 25 steps down the DC current supplied from the fuel cell 11 through a secondary precharge portion 17 for charging the auxiliary battery.

A control device 27 of a motor 26 for driving the air conditioning apparatus is connected in parallel with the fuel cell 11 through a secondary precharge portion 17, and the control device 27 converts the DC current output from the fuel cell 11 and the power storage unit 12 for supplying to the motor 26.

The ECU 18 comprises, for example, a motor ECU 31, a fuel cell control portion 32, and a power storage unit control portion 33.

The motor ECU 31 controls the power transforming operation of the PWM inverter provided in PDU 14. The motor ECU 31 outputs switching commands such as a U-phase AC voltage command value $*V_u$, a V-phase AC voltage command value $*V_v$, and a W-phase AC current voltage command value $*V_w$, and the motor ECU 31 outputs the U-phase current, V-phase AC current, and W-phase currents, respectively, corresponding to those voltage command values $*V_u$, $*V_v$, and $*V_w$ to respective phases of the driving motor 11.

For implementing the above operations, various signals are input into the motor ECU 31. The various signals include a signal of an accelerator operation amount θ TH related to an accelerator pedal depression, a signal of a magnetic pole position (electric angle) output from the magnetic pole position-angular velocity detector 35, a signal of the brake actuation state detector BR for detecting an actuating state of the brake by a driver, signals of respective phase currents $I_u$, $I_v$, and $I_w$, supplied to the driving motor from the PDU 14, a signal of the motor current $I_{motor}$ represented as a DC component, and a signal of a supply voltage $V_{DC-in}$ supplied to the PDU 14.

The fuel cell control portion 32 outputs a rotational rate command value N as a driving command to auxiliary devices for driving the fuel cell such as an air compressor, controls operations of the contact point of each relay provided with the high voltage switch and the current controller in the primary precharge portion 16, and outputs a current command value IFCCMD to the current controller such as the DC-DC chopper in the secondary precharge portion 17.

Therefore, various signals are input into the fuel cell control portion 32 such as a signal concerning an output request value *P for the driving motor 14 output from the motor ECU 31 and an output $P_{mot}$ from the driving motor, a signal of the motor current Is/c of the motor for driving the air compressor 15, output from the control portion 23, signals concerning the output current $I_{fc}$ and the output voltage $V_{fc}$ and a DC voltage signal $V_{DC-out}$ output from the DC-DC chopper in the secondary precharge portion 17, and a signal of a current value $I_{out-Total}$ output from the current detector 36 disposed between the primary precharge portion 16 and the secondary precharge portion 17.

The power storage unit control portion 33 calculates a state of charge (SOC) of the power storage unit, for example, a capacitor and outputs the result to the motor ECU 31 and to the fuel cell control portion 32.

Accordingly, the output current $I_{st}$, the terminal voltage $V_{st}$, and temperature $T_{st}$ of the power storage unit 12 output from the power storage unit 12 are input into the power storage unit control portion 33.

Various signals are also input into the ECU 18 such as a signal concerning the on-off state of a brake such as a foot brake, and a signal concerning the shift position (for example, the D (driving) position or the R (rear) position). For example, the auxiliary devices for driving the fuel cell such as the air compressor are stopped when the rotational rate of the driving motor 13 is below a predetermined number including zero, the speed of the fuel cell vehicle 1 is lower than a predetermined value, the outputs of the driving motor and the motor for driving the air compressor 15 are less than predetermined values, the foot brake is activated, and the shift position is in the D position, the terminal voltage $V_{st}$ of the power storage unit 12 is higher than a predetermined voltage, and, in addition, when the operation of the motor 26 for driving the air conditioner is stopped, when the hydrogen for the fuel cell is combusted in the heating mode of the air conditioner, and when voltage of the auxiliary 12V battery is higher than a predetermined voltage.

The idle control device 10 according to an embodiment of the present invention is provided with the above-described structure. Below, operations of the idle control device 10 of the fuel cell vehicle and particularly, a procedure to execute the idle stop will be described with reference to the attached drawings.

Figure 2:
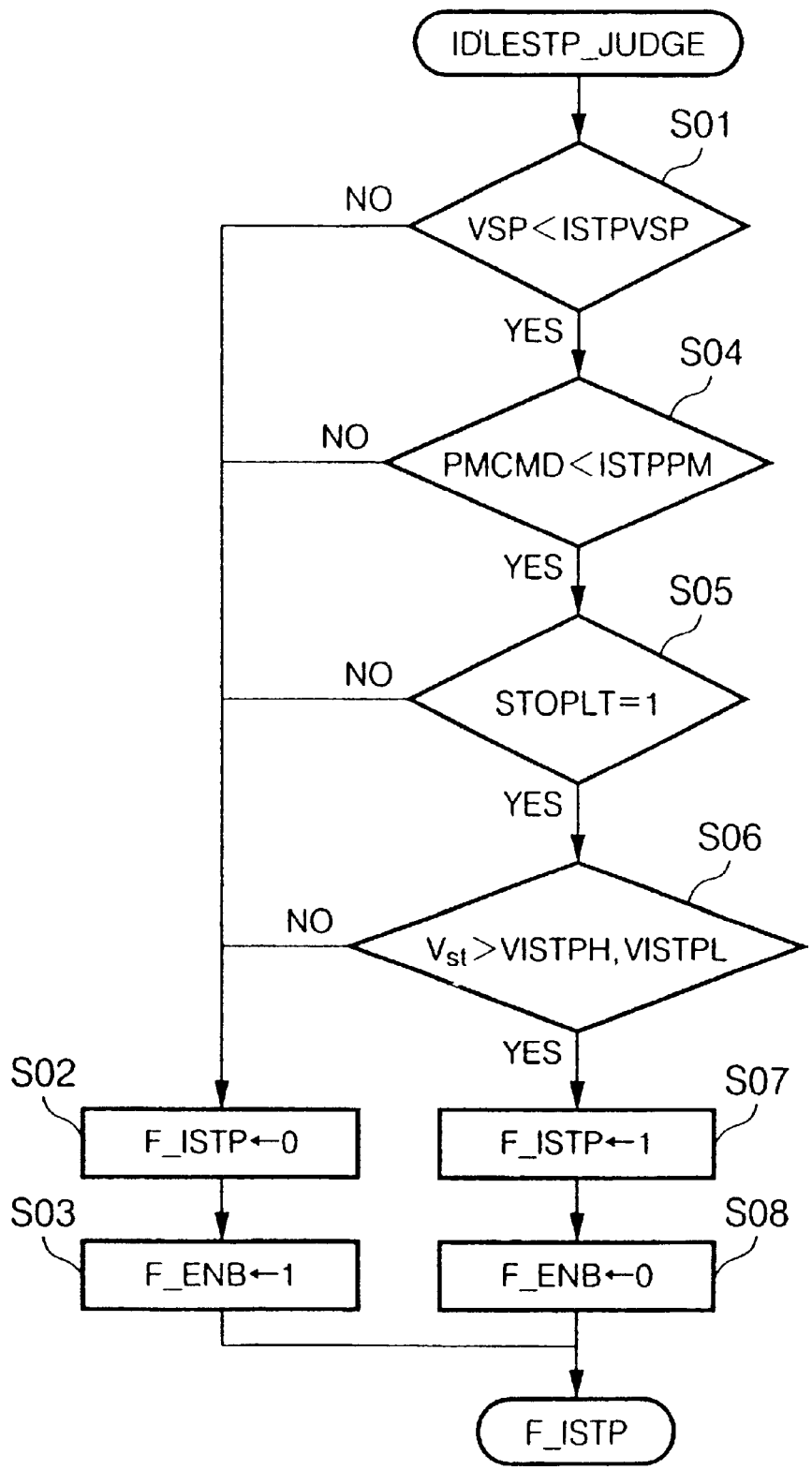
FIG. 2 is a flowchart showing operations of the idle control device for the fuel cell vehicle, especially showing operations for determining of the idle stop execution.
Figure 3:
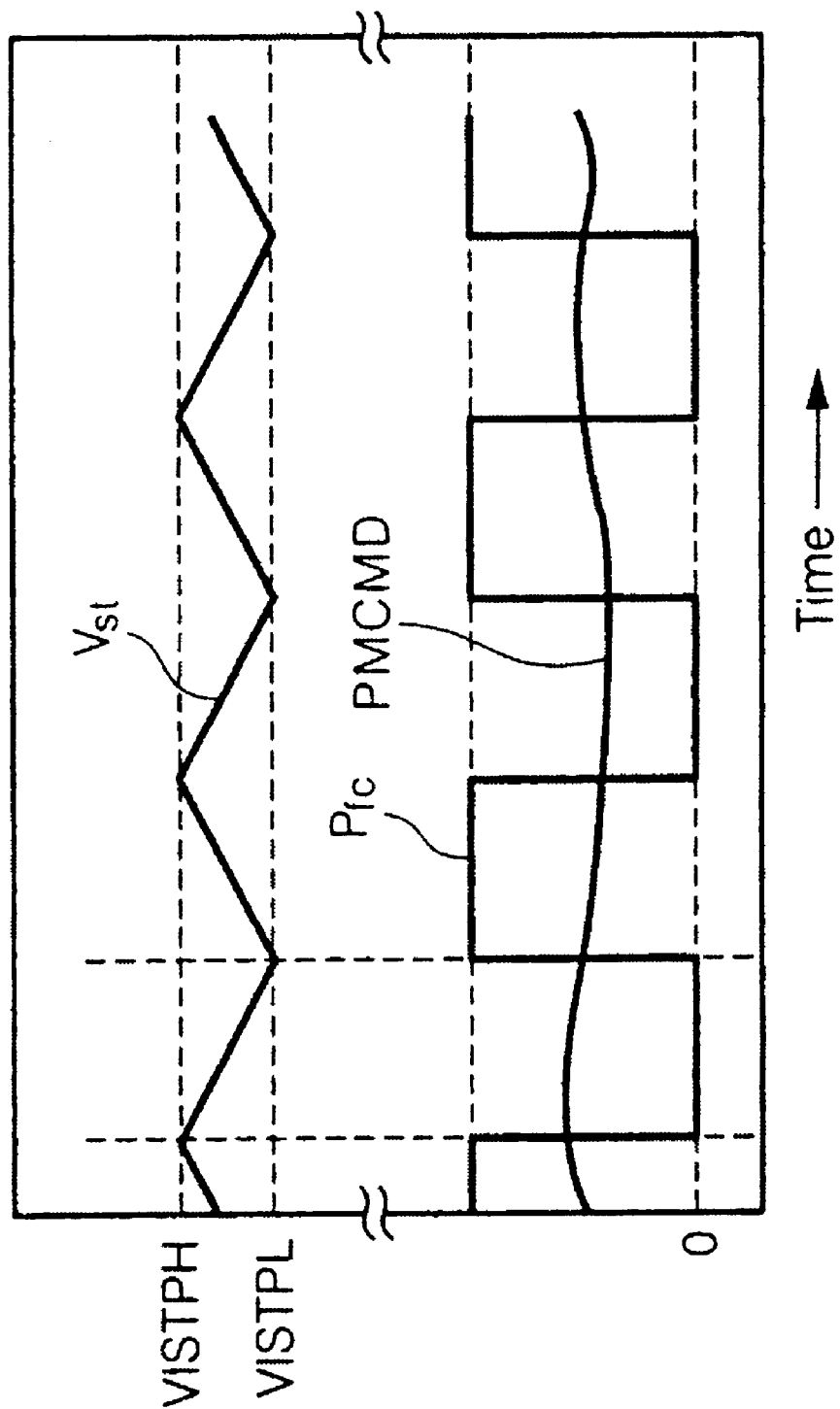
FIG. 3 is a graph showing time dependent changes of the power generation output of the fuel cell $P_{fc}$ and the terminal voltage $V_{st}$ of the battery device.
Figure 4:
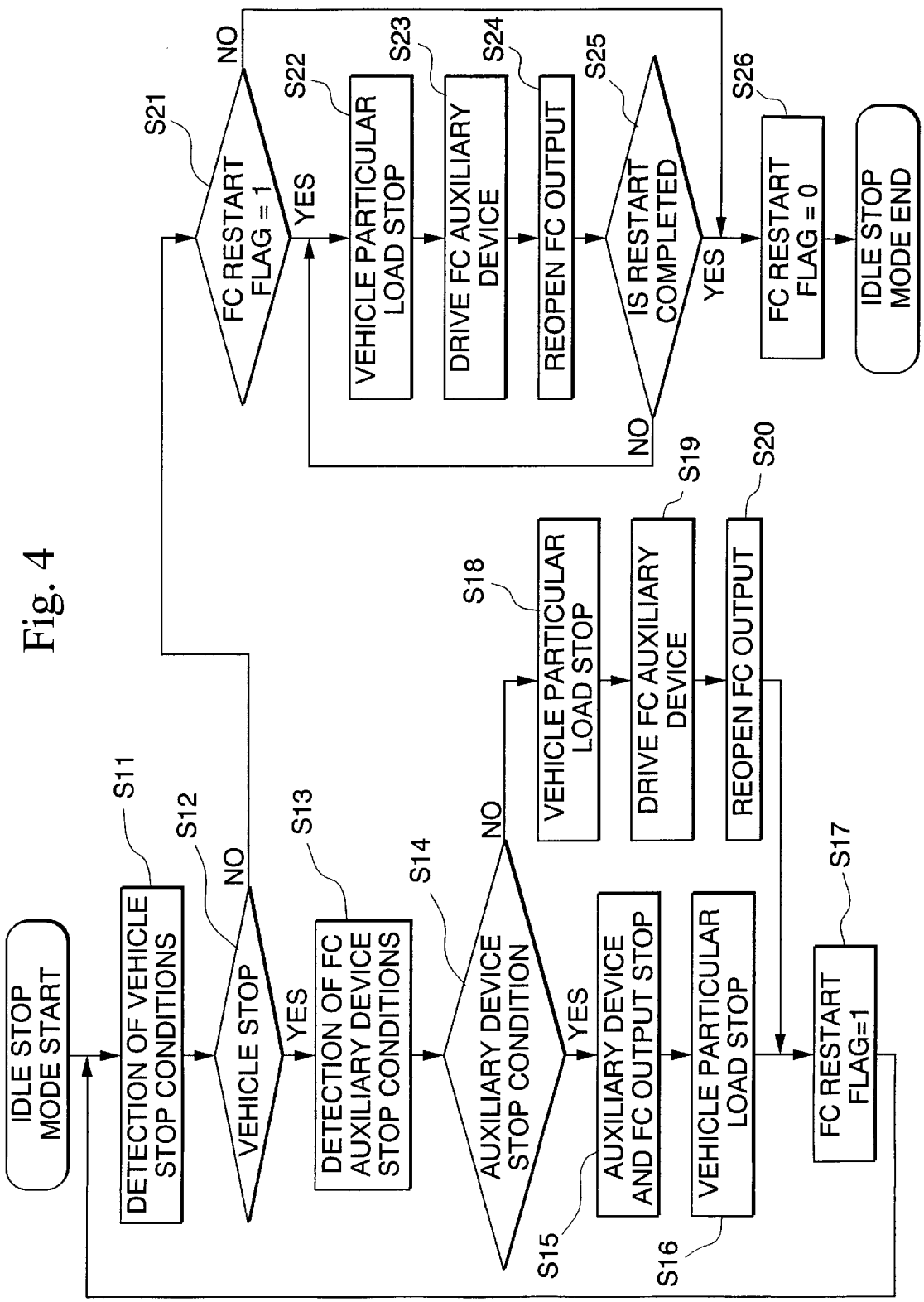
FIG. 4 is a flowchart showing the idle stop operations.
Figure 5:
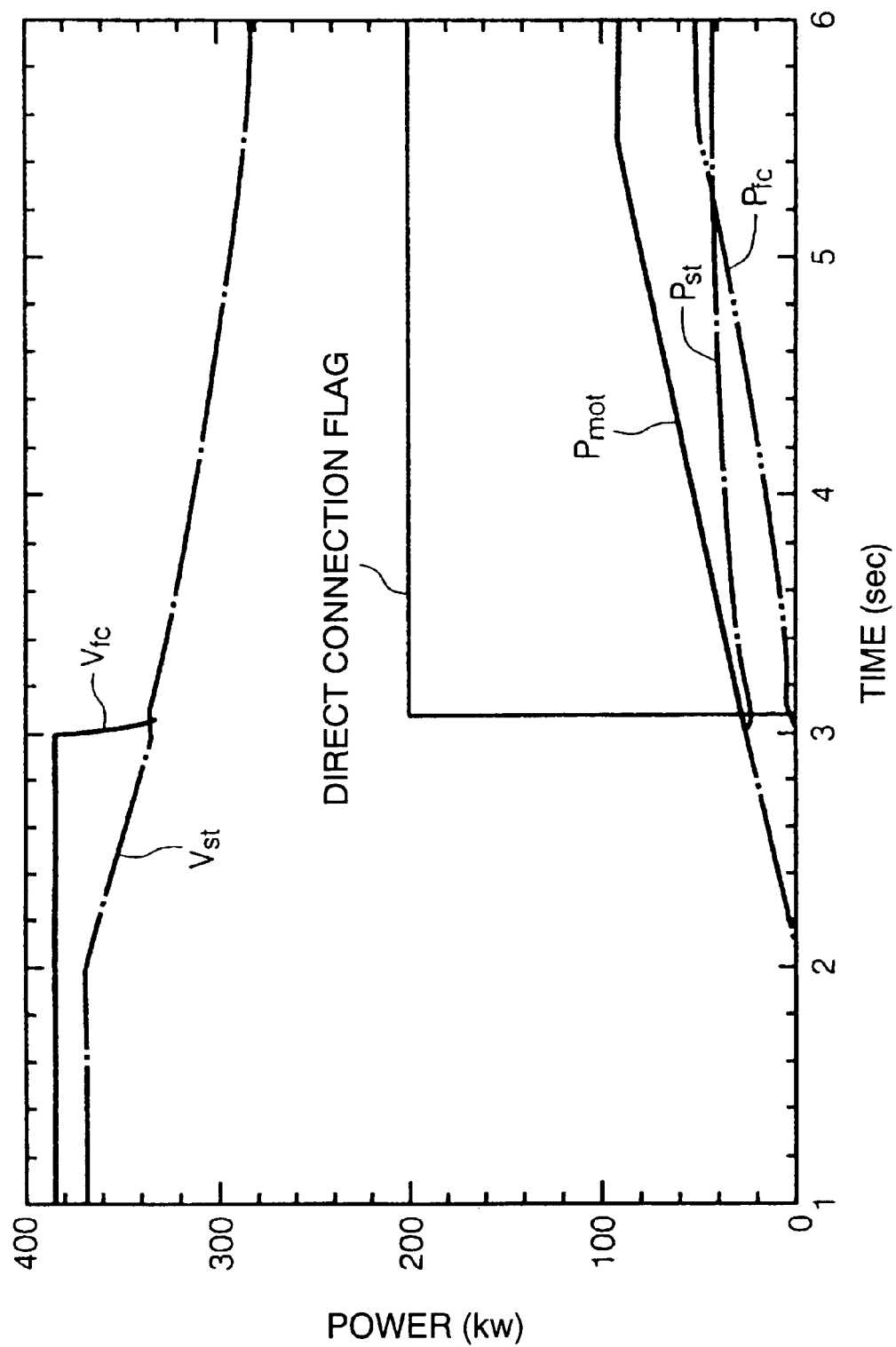
FIG. 5 is a graph showing the time dependent changes of the terminal voltage of the power storage unit $V_{st}$, the output voltage of the fuel cell $V_{fc}$, the output of the fuel cell $P_{fc}$, the output of the power storage unit $P_{st}$, and the output of the driving motor $P_{mot}$.
Figure 6:
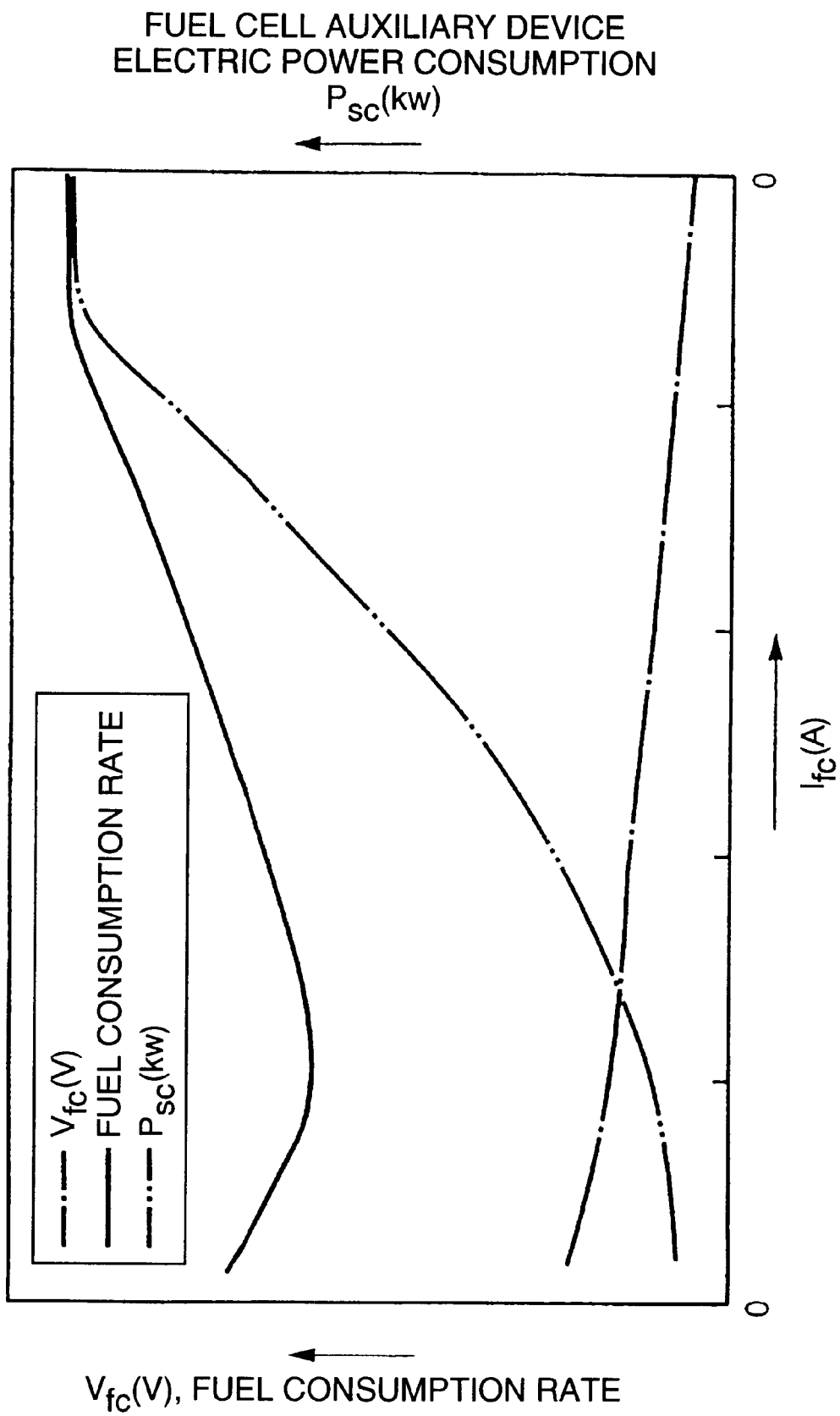
FIG. 6 is a graph showing the power generation efficiency of the fuel cell.

FIG. 2 is a flowchart showing operations of the idle control device 10 of the fuel cell vehicle, and particularly showing a procedure for determining the idle stop operation. FIG. 3 is a diagram showing time dependent changes of the terminal voltage $V_{st}$ and the generation output Pfc of the fuel cell 11. FIG. 4 is a flowchart showing procedure for executing the idle stop. FIG. 5 is a diagram showing the time dependent changes of the terminal voltage $V_{st}$ of the power storage unit 12, the output voltage $V_{fc}$ of the fuel cell 11, the output Pfc of the fuel cell 11, the output $P_{st}$ of the power storage unit 12, and the output $P_{mot}$ of the driving motor 13.

In order to improve the fuel consumption efficiency of a fuel cell vehicle provided with a hybrid power source consisting of a fuel cell and a power storage unit, the present invention provides a series of control operations in line with a flowchart shown in FIG. 3.

The control operations starts from a first step of determining whether the vehicle speed VSP is lower than a predetermined speed ISTPVSP (step S01). Subsequently, it is determined whether the total output PMCMD of the driving motor and the motor for driving the air compressor for driving the fuel cell is less than a predetermined motor output ISTPPM (step S04), then it is determined whether the brake is operating (step S05), and it is determined whether the terminal voltage $V_{st}$ is higher than predetermined voltages VISTPH and VISTPL (step S06). When all of the above determinations are "YES", then the idle stop execution permission flag F_ISTP is set to "1". In contrast, when any one of the determinations is "NO", the idle stop execution permission flag F_ISTP is set to "0".

In practice, in step S01 shown in FIG. 3, it is determined whether the vehicle speed VSP is lower than a predetermined speed ISTPVSP.

When the determination is "YES", steps below step S4, which is described later, are executed.

In contrast, if the determination in step S01 is "NO", the idle stop execution permission flag F_ISTP is set to "0" in the subsequent step S02, and the flow proceeds to step S03.

In step S03, the fuel cell 11 operation permission flag F_ENB is set to "1", and this flow of steps is completed.

In step S04, it is determined whether the total motor output PMCMD of both driving motor 13 and the motor for driving, for example, the air compressor 15, is lower than a predetermined motor output ISTPPM.

When the determination is "NO", steps below step S02 are executed.

In contrast, when the determination is "YES", it is determined whether the brake is in the "ON" state in the subsequent step S05.

When the determination in step S05 is "NO", steps below step S02 are executed.

In contrast, when the determination in step S05 is "YES", the flow proceeds to step S06.

In step S06, it is determined whether the terminal voltage of the power storage device 12 is higher than predetermined voltages VISTPH and VISTPL.

When the determination is "YES", the flow proceeds to step S07.

It is noted that there are two predetermined voltages VISTPH and VISTPL, which are defined as the high side and low side hysteresis voltages. The high side voltage VISTPH is used in the case of determining when the vehicle is shifted to an idle stop mode, and the low side voltage VISTPL is used in the case of determining when the vehicle exits from the idle stop state.

That is, as shown in FIG. 3, when the terminal voltage Vst exceeds the higher predetermined voltage VISTPH, the vehicle is shifted to the idle stop state, and the fuel cell is stopped and the fuel cell output $P_{fc}$ is set to zero. While the vehicle is in the idle stop state, if the terminal voltage is reduced below the lower predetermined voltage VISTPL, the vehicle exits from the idle stop state and the fuel cell restarts the power generation. When the terminal voltage $V_{st}$ again exceeds the higher predetermined voltage VISTPH, the vehicle is shifted to the idle stop state.

Note that the high side predetermined voltage VISTPH is set to a terminal voltage (for example, approximately 360V), which corresponds to the terminal voltage necessary for driving the fuel cell driving auxiliary device such as the air compressor for one minute, and the low side predetermined voltage VISTPL is set, for example, at 300V, so as to be capable of smoothly restarting the driving motor 13 in addition to driving the fuel cell driving auxiliary device such the air compressor 15.

In step S07, the idle stop execution permission flag F_ISTP is set to "1", and the flow proceeds to step S08.

In step S08, the fuel cell actuation permission flag F_ENB is set to "0", and the flow of steps is completed.

Hereinafter, the flow of the idle stop mode will be described.

When the idle stop mode is started after, for example, the idle stop execution permission flag F_ISTP is set to "1", first, stop conditions for the fuel cell vehicle 1 are detected.

Next, in step S12, it is determined whether the stop conditions of the fuel cell vehicle 1 are fulfilled.

If the determination in step S12 is "NO", the flow below step S21 is executed.

If the determination in S12 is "YES", the flow proceeds to step S13.

In step S13, stop conditions of the fuel cell driving auxiliary device such as the air-compressor are detected.

Next, in step S14, it is determined whether the stop conditions of the fuel cell driving auxiliary device are fulfilled.

When the determination in step S14 is "NO", the flow below step S18 is executed.

In contrast, when the determination in step S14 is "YES", the flow proceeds to step S15.

In step S15, the operation of the fuel cell driving auxiliary devices such as the sir-compressor 15 is stopped, and the output of the fuel cell is stopped.

Subsequently, in step S16, particular loads of the fuel cell vehicle 1 including, for example, auxiliary devices except various control devices are stopped, the flow proceeds to step S17, wherein the restarting flag of the fuel cell 11 is set to "1", and the flow proceeds to step S11.

In step S18, the particular load of the vehicle is stopped, the fuel cell driving auxiliary devices such as the air compressor 15 is driven in the subsequent step S19, and in step S20, the output of the fuel cell is reopened and the steps below step S17 are executed.

In step S21, it is determined whether the restarting flag of the fuel cell is "1".

When the determination is "NO", the flow proceeds to step S26, which is described later.

In contrast, when the determination is "YES", the particular load for the fuel cell vehicle 1 is stopped in step S22, and the flow proceeds to step S23.

In step S23, the fuel cell driving auxiliary devices such as the air compressor 15 is driven, and the power generation and the output of the fuel cell 11 is restarted in the subsequent step S24.

In step S25, it is determined whether the fuel cell 11 is restarted.

When the determination in step S25 is "NO", the steps below step S22 are executed.

In contrast, when the determination in step S25 is "YES", the flow proceeds to step S26.

In step S26, the restarting flag of the fuel cell 11 is set to "0", and the flow of the idle stop mode is completed.

That is, as shown in FIG. 5, when the energy consumption increases while the power generation of the fuel cell 11 is stopped during the idle stop mode, the electric power is first supplied from the power storage unit 12, and the terminal voltage $V_{st}$ decreases with increasing output $P_{st}$ of the power storage unit 12.

After the air compressor is actuated and power generation of the fuel cell 11 is restarted, the output $P_{st}$ from the power storage unit 12 reaches a saturated value with increasing output $P_{fc}$ of the fuel cell 11 by the power generation.

Note that, after the power generation of the fuel cell 11 is restarted, the output currents of the primary precharge portion 16 and the secondary precharge portion 17 are limited extending over a predetermined period of time, and the direct connection flag directly connecting the fuel cell 11 and the power storage unit 12 is set to "1" by stopping the limit control of the output current at the time when the output voltage $V_{fc}$ of the fuel cell 11 and the terminal voltage $V_{st}$ of the power storage unit 12 both reach equilibrium voltage.

As described above, the idle control device 10 according to the embodiment of the present invention allows to control the remaining capacity of the power storage unit 12 constituted by, for example, a capacitor, that is, the terminal voltage $V_{st}$ of the power storage device 12 within a range between the low side predetermined voltage VISTPL and the high side predetermined voltage VISTPH, so that it becomes possible to efficiently utilize the power supply from the power storage unit 12 while allowing the smooth restarting of the fuel cell 11, which result in improving the fuel consumption efficiency.

In the present embodiment, execution of the idle stop operation is determined whether the terminal voltage $V_{st}$ of the power storage unit 12 is higher than the predetermined voltages VISTPH and VISTPL. However, execution of the idle stop operation is not limited to the terminal voltage of the power storage device, and it is possible to determine execution of the idle stop operation depending on whether the state of charge SOC of a battery is higher than the predetermined state of charge values SOCH and SOCL, when the battery is used as the power storage unit 12.

In this case, the high state of charge SOCH is usually set to 81%, and the low state of charge SOCL is set to, for example, 56%. Settings of the high state of charge and the low state of charge as shown above make it possible to restart the driving motor smoothly in addition to smooth driving of the auxiliary device such as the air compressor 15.

What is claimed is:

1. An idle control device for a fuel cell vehicle, comprising:

a power storage unit for supplying electric power to at least one of a driving motor of the fuel cell vehicle and auxiliary devices of the fuel cell vehicle for assisting output of a fuel cell, said power storage unit also storing energy generated by the fuel cell together with regenerative energy obtained by a regenerative operation of the driving motor;

a fuel cell driving device for supplying reaction gases for power generation by the fuel cell, and a fuel cell drive control device for controlling operation of the fuel cell driving device based at least in part on operational parameters of the fuel cell vehicle;

wherein when the fuel cell vehicle is in a predetermined idling state, the fuel cell drive control device controls the fuel cell driving device to stop the power generation of the fuel cell by stopping supply of the reaction gases.

2. An idle control device for a fuel cell vehicle according to claim 1, wherein the fuel cell drive control device comprises:

a rotational rate detecting device for detecting a rotational rate of the driving motor;

a brake operation state detecting device for detecting the operational state of a brake of said fuel cell vehicle;

a state of charge detecting device for detecting a state of charge of said power storage unit; and a load detecting device for detecting an electric load of said fuel cell vehicle;

wherein the power generation of said fuel cell vehicle is stopped by stopping supply of said reaction gases, when said rotational rate detecting device, said brake operation state detecting device, said state of charge detecting device, and said load detecting device detect that the fuel cell vehicle is in the idling state which is capable of stopping the power generation of the fuel cell by stopping supply of said reaction gases.

3. An idle control device for a fuel cell vehicle according to claim 2, wherein said power storage unit comprises an electric double layer capacitor, and said state of charge of the power storage unit is determined by a charge voltage of said electric double layer capacitor.

4. An idle control device for a fuel cell vehicle according to claim 3, wherein said predetermined state of charge is set to a value capable of driving said fuel cell driving device and said driving motor for a predetermined time.

5. An idle control device for a fuel cell vehicle according to claim 2, wherein when said rotational rate is zero or lower than a predetermined rotational rate, said brake is in the ON state, said state of charge of the power storage unit is less than a predetermined state of charge, and said electric load is less than a predetermined load, it is determined that the vehicle is in the idling state capable of stopping the power generation of said fuel cell and the power generation of said fuel cell is stopped by stopping supply of said reaction gases by said fuel cell driving device.

6. An idle control device for a fuel cell vehicle according to claim 1, wherein said power storage unit comprises an electric double layer capacitor.

7. An idle control device for a fuel cell vehicle according to claim 1, wherein when said power generation is stopped by said fuel cell driving device, said fuel cell drive control device actuates said fuel cell driving device for restoring power generation by the fuel cell when said state of charge of said power storage unit is reduced below a predetermined state of charge.

* * * * *